United States Patent
Subramanian et al.

(10) Patent No.: US 7,471,942 B2
(45) Date of Patent: Dec. 30, 2008

(54) SYSTEM AND METHOD FOR INCREASED BATTERY SAVING DURING IDLE MODE IN A WIRELESS COMMUNICATION SYSTEM

(75) Inventors: Vijay G. Subramanian, Chicago, IL (US); Anand S. Bedekar, Arlington Heights, IL (US); Stavros Tzavidas, Evanston, IL (US)

(73) Assignee: Motorola, Inc., Schaumburg, IL (US)

( * ) Notice: Subject to any disclaimer, the term of this patent is extended or adjusted under 35 U.S.C. 154(b) by 327 days.

(21) Appl. No.: 11/436,242

(22) Filed: May 18, 2006

(65) Prior Publication Data
US 2007/0270118 A1    Nov. 22, 2007

(51) Int. Cl.
*H04B 1/16* (2006.01)
*H04Q 7/20* (2006.01)

(52) U.S. Cl. ............... 455/343.2; 455/574; 340/7.32; 370/311

(58) Field of Classification Search ... 455/343.1–343.4, 455/574; 340/7.32–7.35, 7.38; 370/311
See application file for complete search history.

(56) References Cited

U.S. PATENT DOCUMENTS

2006/0029011 A1*  2/2006  Etemad et al. ............... 370/311
2006/0194598 A1*  8/2006  Kim et al. .................... 455/509

* cited by examiner

*Primary Examiner*—Lee Nguyen

(57) ABSTRACT

A method and information processing system for wirelessly transmitting at least one of a downlink channel descriptor and an uplink channel descriptor for reception by at least one wireless device (104). The method comprises selecting at least one transmission time for transmitting a pointer that indicates a transmission time for a DCD and/or a UCD. The pointer is transmitted at a time between a first transmission and a second transmission of the at least one of downlink channel descriptor and uplink channel descriptor. The transmission time is selected to reduce a time interval for the at least one wireless device (104) to search for the at least one of the DCD and UCD. Also, a message that includes DCD information and/or UCD information associated with at least one neighboring cell can also be chosen to transmit at specifically chosen times to the at least one wireless device (104).

19 Claims, 7 Drawing Sheets

SYSTEM AND METHOD FOR INCREASED BATTERY SAVING DURING IDLE MODE IN A WIRELESS COMMUNICATION SYSTEM

FIELD OF THE INVENTION

The present invention generally relates to the field of wireless communications, and more particularly relates to network procedures for saving battery life on a wireless device in a wireless communication system.

BACKGROUND OF THE INVENTION

Wireless communication systems have evolved greatly over the past few years. Current wireless communication systems are capable of transmitting and receiving broadband content such as streaming video and audio. Wireless communication systems generally are comprised of wireless devices and access points, referred to as "base stations", which provide communication services to the wireless devices. The area covered by a single access point, or base station, is commonly called a "cell". Wireless devices roam into different cells as they move around and connect to different base stations. Typically, the base stations regularly transmit broadcast messages which provide information about the particular base station, as well as the network, its structure, and its capabilities. These broadcast messages are used by wireless devices to obtain information about the network and further obtain the appropriate parameters for communication with the base stations. In most wireless communication standards and technologies, the broadcast messages are fairly large and are not continuously transmitted by the network. The broadcast messages, are instead, transmitted according to some time schedule that each base station defines in order to reduce overhead and use of wireless resources.

Wireless devices typically operate on a battery, which has a limited lifetime. Conserving battery resources at the mobile device is essential in order to prolong the time a mobile device can operate without requiring its battery to be recharged. A common method of extending battery life in modern wireless communication systems is by introducing an additional mode of operation for mobile devices, typically called "idle mode". During normal operation, the wireless communication network tracks the movements of each active mobile device down to the base station level, i.e., it is constantly aware of which base station each mobile device is connected to at any given time. When a mobile device is not actively engaged in some sort of communication with the network, this level of granularity is no longer needed and the network can elect to track the mobile device at a much coarser level. The mobile device can, in turn, switch off its radio receiver and transmitter and thus conserve battery resources. This is done by allowing the mobile device to enter idle mode. Typically in idle mode, the location of a device is tracked by the network at the level of group of base stations, typically called a "paging group".

An idling mobile device can switch off its radio and other functions and is not required to monitor every transmission by the network. However, an idling wireless device is still required to periodically wake up and monitor the network's transmissions for a short time, typically called the "paging listening interval". This is done so that the network can inform the mobile device of any incoming traffic. When the wireless device is in a sleep mode, we typically say that it is in a "sleeping time interval". The schedule and relative duration of sleeping to paging listening intervals can be different for each wireless device, but typically remains unchanged as long as the wireless device stays within the same paging group.

A wireless device, when it enters idle mode, is given a particular sleeping and paging interval schedule by the base station. A listening/paging interval schedule is typically defined through a set of parameters that are communicated to each idling wireless device. These parameters typically consist of a paging frequency and a paging offset, which jointly define how often the wireless device is expected to become available for paging and traffic notifications from the network. Typically, a number of schedules, for different levels of availability, are configured in each paging group and the wireless device is given one of the available schedules when it enters idle mode. The wireless device is also typically responsible for monitoring if it has moved into the area of a different base station, but is only required to notify the network when it roams into the area of a different paging group.

In modern wireless communication systems, the base station is typically responsible for regulating wireless transmissions within its area (within its cell). This is typically done by enforcing some slotted time structure in which the schedule for transmissions and receptions for the next unit of time is periodically communicated by a base station to all the wireless devices in its cell. The time unit used for regulating transmissions in a cell is commonly referred to as a "frame". At the beginning of each frame a base station transmits a minimal amount of identifying information to make each wireless device aware of the origin of the communicated schedule. This information is kept at a minimum due to the increased frequency of transmissions. For example, typical frame sizes are in the order of 5 msec or even 1 msec. Transmitting a large amount of information at the beginning of each frame unnecessarily increases overhead and wastes system resources. Information, such as the paging group to which a base station belongs and other details about the structure of the upstream and downstream channels and the settings currently in use, are reserved for larger system broadcast transmissions which happen much less frequently.

Typically, when an idling wireless device roams into the area of a base station belonging to a different paging group, it has to wait for the system broadcast transmissions, DCD/UCD in order to detect if it has roamed into a different paging group, and determine the appropriate actions (e.g., a wireless device is required to notify the network when it roams into a different paging group). Generally, the wireless device has no information about the time schedule of the DCD/UCD transmissions. Therefore, the wireless device has to monitor every subsequent frame from the new base station until the system broadcast information appears, which unnecessarily expends battery life of the wireless device.

Therefore a need exists to overcome the problems with the prior art as discussed above.

SUMMARY OF THE INVENTION

Briefly, in accordance with the present invention, disclosed are a method and information processing system for wirelessly transmitting at least one of a downlink channel descriptor and an uplink channel descriptor for reception by at least one wireless device. The method comprises selecting at least one transmitting time for reception by at least one wireless device, a pointer that indicates a transmission time for a downlink channel descriptor and/or an uplink channel descriptor. The pointer is transmitted at a time between a first transmission and a second transmission of the at least one of downlink channel descriptor and uplink channel descriptor.

The transmission time is selected to reduce a time interval for the at least one wireless device to search for the at least one of the downlink channel descriptor and uplink channel descriptor. Also, a message that includes downlink channel descriptor information and/or uplink channel descriptor information associated with at least one neighboring cell can also be transmitted to the at least one wireless device.

In another embodiment, a method with a wireless device for determining a transmission time for at least one of a downlink channel descriptor, and an uplink channel descriptor is disclosed. The method comprises receiving a pointer indicating a transmission time of at least one of a downlink channel descriptor and an uplink channel descriptor. In response to receiving the pointer, the wireless device ceases to monitor for the at least one of the downlink channel descriptor and uplink channel descriptor. The method further comprises determining if the transmission time for the at least one of the downlink channel descriptor and the uplink channel descriptor has occurred. In response to the transmission time being determined to have occurred, the wireless device monitors for reception of the at least one of the downlink channel descriptor and the uplink channel descriptor. In response to receiving the at least one of the downlink channel descriptor and the uplink channel descriptor, the wireless device determines a new time interval between transmissions of the at least one of the downlink channel descriptor and the uplink channel descriptor.

In yet a further embodiment, an information processing system, in a wireless communication system, for notifying at least one wireless device of a transmission time for at least one of a downlink channel descriptor and an uplink channel descriptor is disclosed. The information processing system comprises at least one processing unit and a memory communicatively coupled to the at least one processing unit. The information processing system further comprises a transmitter that is communicatively coupled to the memory and the at least one processing unit. The transmitter selects at least one transmission time and then transmits, for reception by at least one wireless device, at least one of a pointer indicating a transmission time for at least one of a downlink channel descriptor and an uplink channel descriptor. The transmitter can also transmit a message including downlink channel descriptor and uplink channel descriptor information associated with at least one neighboring base station.

In a further embodiment, a base station determines the timing of transmission of at least one of a downlink channel descriptor, an uplink channel descriptor and/or a pointer indicating the transmission time of at least one of a downlink channel descriptor and an uplink channel descriptor. The base station determines the timing schedule of sleeping and paging listening intervals of neighboring paging groups. The base station uses this timing in order to determine when mobile devices roaming from neighboring paging groups are likely to be available. This information can also be used for determining the timing of the transmissions of at least one of a downlink channel descriptor, an uplink channel descriptor and/or a broadcast control pointer in the current cell.

In another embodiment, a base station determines the timing of transmitting a message containing the DCD/UCD of neighboring cells, possibly belonging to different paging groups. The base station transmits the message containing the DCD/UCD of neighboring cells during the paging listening intervals of the paging group(s) to which the current base station belongs.

An advantage of the foregoing embodiments of the present invention is that the battery life of a wireless device in a time division duplexing system is extended. A broadcast control pointer ("BCP") information element is transmitted between transmissions of the DCD/UCD. The BCP informs the wireless device of the frame that the DCD/DCD is transmitted on. The wireless device only needs to monitor that specified frame, as compared to every frame, to receive the DCD/UCD information. This extends the battery life of the wireless device.

Additionally, each cell in a paging group determines the paging frequency and offset of its neighboring paging groups. During the listening interval of the neighboring paging groups, one or more cells in the paging group transmit the BCP. This allows for a wireless device that is entering into the paging group (e.g., a wireless device without the paging parameters of the new paging group) to only monitor the frame indicated by the BCP to receive the DCD/UCD information. This also extends the battery life of the wireless device.

Finally, when a base station transmits a Mobility Neighbor Advertisement, "MNA" message, containing the DCD/UCD of neighboring cells, during the paging listening intervals of the paging groups to which this base station belongs, any idling mobile devices currently in this base station's cell can obtain the DCD/UCD of neighboring cells even before they roam into their area. In this manner, and in the event that they roam into one of the neighboring cells, they are already aware of whether the new cell belongs to a different paging group and whether further action is needed. In this manner, mobile devices obtain the necessary information during their normal waking schedule and in advance of roaming into neighboring cells, without needing to stay awake for prolonged periods of time, thus conserving their battery power.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term coupled, as used herein, is defined as connected, although not necessarily directly, and not necessarily mechanically.

The term "wireless communication device" is intended to broadly cover many different types of devices that can wirelessly receive signals, and optionally can wirelessly transmit signals, and may also operate in a wireless communication system. For example, and not for any limitation, a wireless communication device can include any one or a combination of the following: a cellular telephone, a mobile phone, a smartphone, a two-way radio, a two-way pager, a wireless messaging device, a laptop/computer, automotive gateway, residential gateway, and the like.

Wireless Communications System

Figure 1:
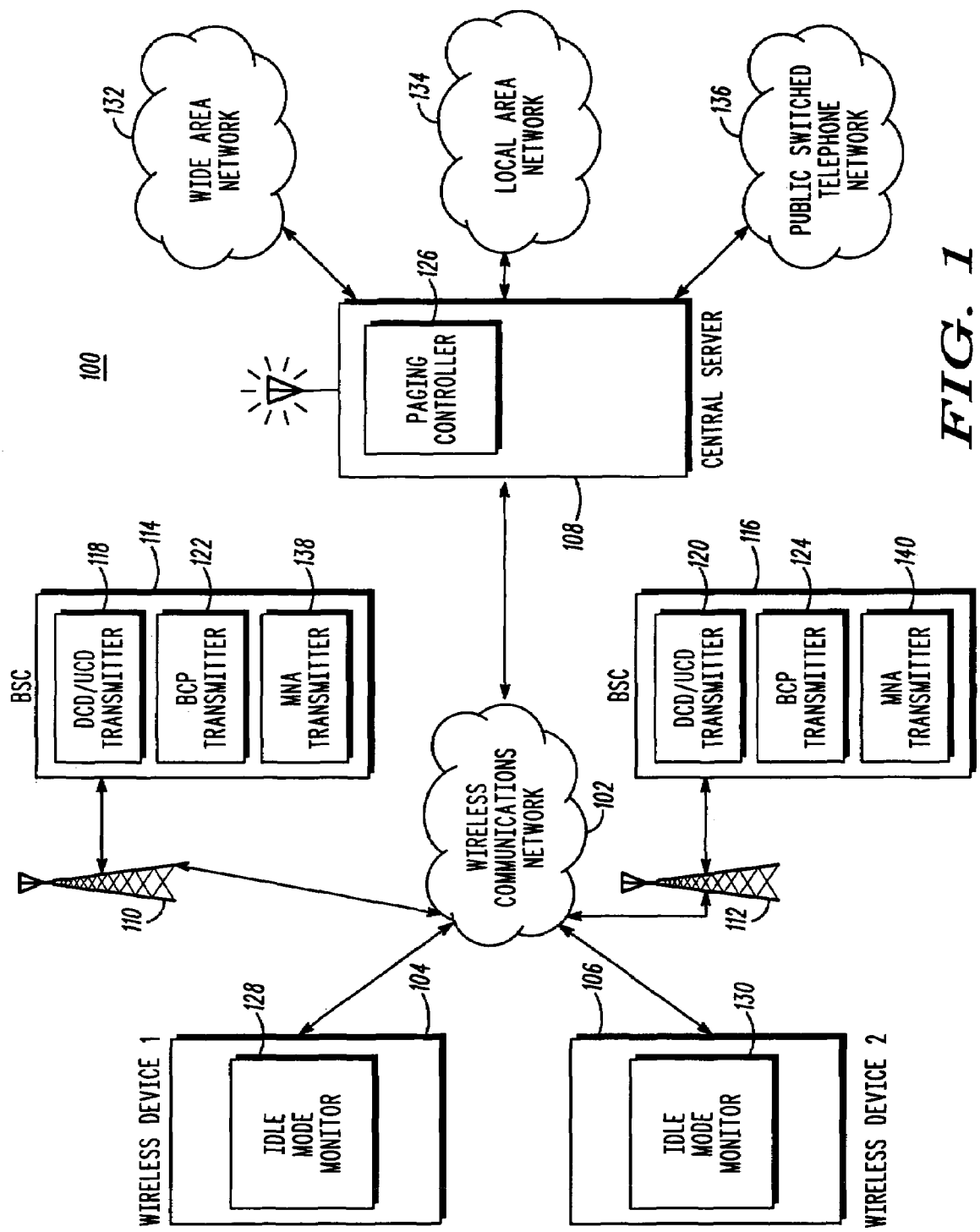
FIG. 1 is block diagram illustrating a wireless communications system according to an embodiment of the present invention.

According to an embodiment of the present invention, as shown in FIG. 1, a wireless communications system 100 is illustrated. FIG. 1 shows a wireless communications network 102 that connects wireless communication devices 104, 106, to each other or to one or more central servers (not shown). The wireless communications network 102, according to the present example, comprises a mobile phone network, a mobile text messaging device network, a pager network, or the like. Further, the communications standard of the wireless communications network 102 of FIG. 1 comprises Code Division Multiple Access (CDMA), Time Division Multiple Access (TDMA), Global System for Mobile Communications (GSM), General Packet Radio Service (GPRS), Frequency Division Multiple Access (FDMA), IEEE 802.16 family of standards, Orthogonal Frequency Division Multiplexing (OFDM), Orthogonal Frequency Division Multiple Access (OFDMA), or the like. Additionally, the wireless communications network 102 also comprises text messaging standards, for example, Short Message Service (SMS), Enhanced Messaging Service (EMS), Multimedia Messaging Service (MMS), or the like. The wireless communications network 102 also allows for push-to-talk over cellular communications between capable wireless communication devices.

The wireless network 102 supports any number of wireless communication devices 104, 106. The support of the wireless network 102 includes, but is not limited to, support for mobile telephones, smart phones, text messaging devices, handheld computers, pagers, beepers, or the like. A smart phone is a combination of 1) a pocket PC, handheld PC, palm top PC, or Personal Digital Assistant (PDA), and 2) a mobile telephone. More generally, a smartphone can be a mobile telephone that has additional application processing capabilities. In one embodiment, wireless communications network 102 allows for mesh networking between the wireless communication devices 104, 106. In an embodiment, the wireless network 102 is capable of broadband wireless communications utilizing time division duplexing ("TDD") as set forth, for example, by the IEEE 802.16e standard. The duplexing scheme TDD allows for the transmissions of signals in a downstream and upstream direction using a single frequency.

An 802.16e ("WiMax") system broadcasts information comprising broadcast messages, referred to as Downlink Channel Descriptor ("DCD") and Uplink Channel Descriptor ("UCD"). In the following discussion, these names refer to the system broadcast information. Another possible duplex scheme is Frequency Division Duplex, in which downstream and upstream communications can happen at the same time, but at different frequencies. It should be noted that the present invention is not limited to an 802.16e system. Other such standards such as 3GPP (Long Term Evolution or UMTS-TDD version), 3GPP2 evolution, and 802.20 are also applicable. The present invention is applicable to any wireless communication system that transmits, among other things, broadcast information in a non-continuous manner and implements an idle mode period for wireless devices subscribing to the system. Furthermore, the wireless communications system 100 is not limited to a system using only a TDD scheme. For example, other duplex schemes may be used for the entire wireless communication system, or TDD may be only used for a portion of the available communication channels in the system 100, while one or more schemes are used for the remaining communication channels.

Each base station 110, 112, in one embodiment, includes a base station controller ("BSC") 114, 116. Each base station controller 114, 116, in one embodiment, includes a DCD/UCD transmitter 118, 120, a BCP transmitter 122, 124, and an MNA transmitter 138, 140. In another embodiment, the DCD/UCD transmitter 118, 120, the BCP transmitter 122, 124, and the MNA transmitter 138, 140 are part of a paging controller (not shown) residing on each BSC 114, 116 that is communicatively coupled to other paging controllers in the wireless system. In yet another embodiment, the DCD/UCD transmitter 118, 120, the BCP transmitter 122, 124, and the MNA transmitter 138,140 are controlled by a paging controller 126 residing on the central server 108, which controls one or more paging groups in the wireless system 100. The BSC 114, 116 and its components are discussed in greater detail below.

The wireless communication devices 104, 106, in one embodiment, are capable of wirelessly communicating data using the 802.16e standard or any other communication scheme that supports TDD. In another embodiment, the wireless communication devices 104, 106 are capable of wireless communications using other access schemes which support other duplexing schemes in addition to, or instead of, TDD. In one embodiment, each wireless device 104, 106 includes an idle mode monitor 128, 130 that monitors frames transmitted by a base station 110, 112 while the device 104, 106 is in an idle mode. The wireless communication devices 104, 106 are discussed in more detail below.

The wireless communications system 100 also includes one or more central servers 108 that maintain and process information for all wireless devices 104, 106 communicating on the wireless network 102. Additionally, each central server 108 communicatively couples the wireless communications devices 104, 106 to a wide area network 132, a local area network 134, and a public switched telephone network 136 through the wireless communications network 102. Each of these networks has the capability of sending data, for example, a multimedia text message, to the wireless devices 104, 106. In another embodiment, the central server 108 includes a paging controller 126. The paging controller 126, in one embodiment, controls the paging functions of a specific paging group or for the wireless communication system 100.

Information Processing System

Figure 2:
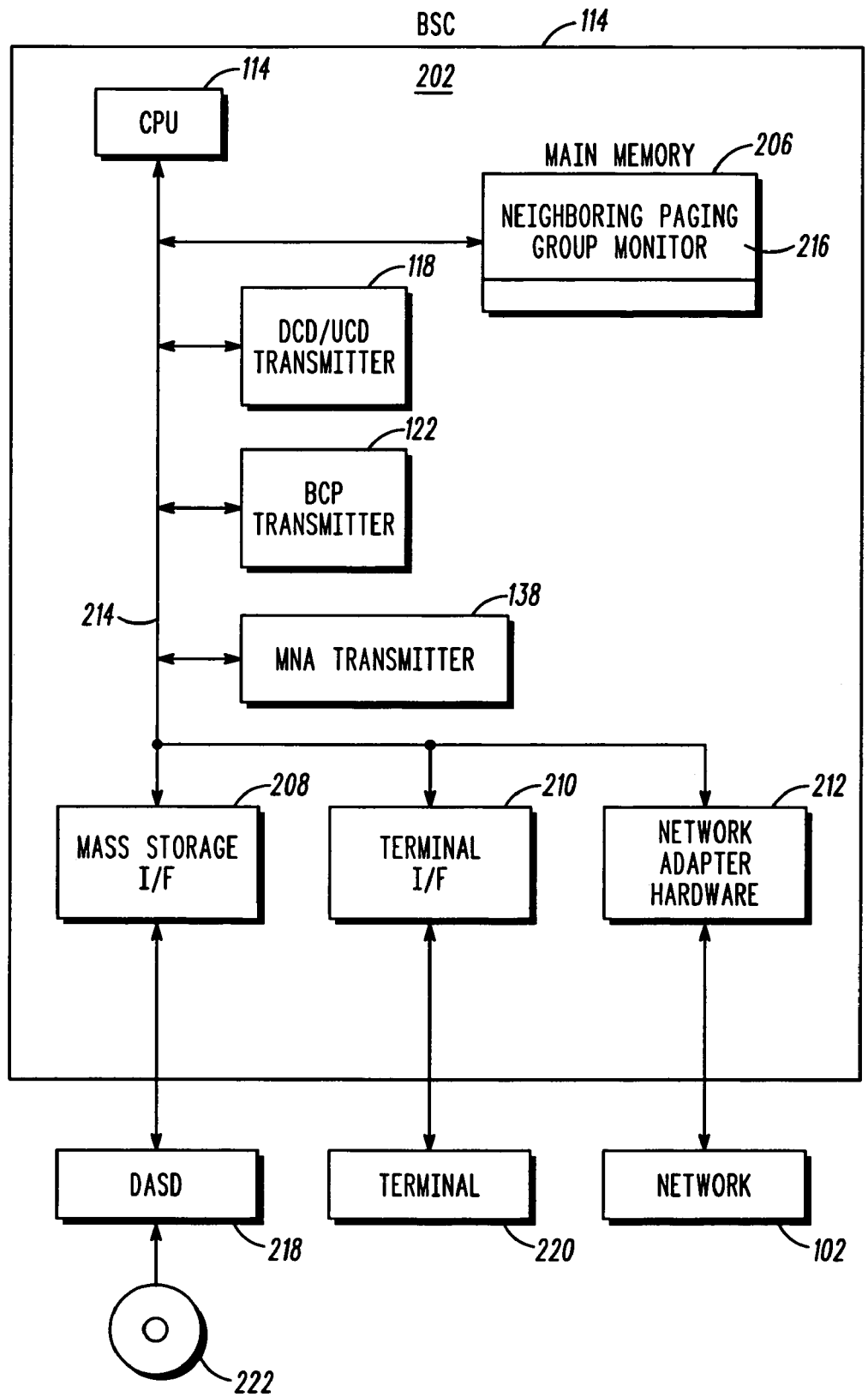
FIG. 2 is a block diagram illustrating a information processing system according to an embodiment of the present invention.

FIG. 2 is a block diagram illustrating a more detailed view of the base station controller 114 according to an embodiment of the present invention. Although the following discussion is with respect to the BSC 114, it is also applicable to the central server 108 in the embodiment where the paging controller includes a DCD/UCD transmitter, a BCP transmitter, and an MNA transmitter. The BSC 114, in one embodiment, resides outside of and is communicatively coupled to its respective base station 110. In another embodiment, the BSC 114 resides within its respective base station 110. The BSC 114 is based upon a suitably configured processing system adapted to implement the embodiment of the present invention. Any suitably configured processing system is similarly able to be used as the BSC 114 by embodiments of the present invention. For example, a personal computer, workstation, or the like, may be used. The BSC 114 includes a computer 202. The computer 202 has a processor 204 that is connected to a main memory 206, a DCD/UCD transmitter 118, a BCP transmitter 122, an MNA transmitter 138, a mass storage interface 208, a terminal interface 210, and a network adapter hardware 212. A system bus 214 interconnects these system components.

The DCD/UCD transmitter 114, in one embodiment, transmits downlink channel descriptors and/or uplink channel descriptors. These descriptors include the necessary information needed by wireless devices in order to communicate with the base station, such as channel parameters, transmitter and receiver settings, and the like. The descriptors further include identifying information that is too large to be transmitted in the beginning of every frame, such as the ID of all the paging groups to which a base station belongs. The wireless devices 104, 106, wanting to subscribe to the cell, receive the ID information of the cell, information associated with the structure of the downlink channel, structure of the uplink channel, and the like from the respective descriptor. A DCD and a UCD are transmitted within one or more frames by the DCD/UCD transmitter.

The BCP transmitter 122, in one embodiment, transmits a BCP that notifies a wireless device 104, 106 in which frame or frames the DCD and UCD information is scheduled to be transmitted in. When the wireless device 104, 106 receives the BCP, it can "sleep" until it is time to decode the frame with the DCD/UCD information. Therefore, the wireless device 104, 106 does not have to monitor every frame for the DCD/UCD information. This saves battery life of the wireless device 104, 106 and air interface resources of the wireless communication system 100.

In one embodiment of the present invention, the BCP transmitter 122 selects a transmission time for transmitting the BCP to wireless devices 104, 106 in its cell. For example, the BCP transmitter 122 transmits the BCP in between transmissions of the DCD/UCD messages at a given frame interval. For example, if thirty (30) frames exist between transmissions of the DCD/UCD messages, the BCP can be transmitted in any frame(s) within those thirty (30) frames. If the BCP is transmitted in the fifteenth ($15^{th}$) frame between DCD/UCD transmissions, the wireless device 104, 106 receives the BCP and can "sleep" until the $31^{st}$ frame where the DCD/UCD information is transmitted. This is only an example and the DCD/UCD and BCP information can be transmitted on any and on multiple frame(s). For example, the BCP can be transmitted at a ⅓, ½, ⅔ (and the like) point in time between the first transmission and the second transmission of the DCD/UCD.

In one embodiment, the BCP transmitter 122 can transmit the BCP during the paging listening interval of its paging group. In this embodiment, the wireless device 104, 106 monitors every frame until it receives BCP and then "sleeps" until the frame with the DCD/UCD information is received. In another embodiment, the BSC 110 knows or can anticipate the paging listening interval of a neighboring paging group. A paging listening interval is an interval of time that the wireless device 104, 106 makes itself available to the BSC 114 or paging controller 108 (even in idle mode) so that the device 104, 106 can be notified of an incoming call. A paging group can have a standard paging listening interval for all of its subscribed devices, or it can have a plurality of listening interval schedules, assigning each mobile device to one of them as mobile devices enter idle mode. The BCP transmitter 122 can then transmit the BCP in frames within the paging listening interval.

In another embodiment, the main memory 206 includes a neighboring paging group monitor 216. The neighboring paging group monitor 216 determines the identity of neighboring paging groups and the frequency and offset of their paging listening intervals. In one embodiment, the neighboring paging group monitor 216 determines this information by direct peer-to-peer communication with the base stations of the neighboring paging groups. In another embodiment, a base station 110, 112 is notified of the paging offset/cycle of neighboring paging groups by configuration. In one embodiment, configuration information can be in the form of configuration files, or settings and information communicated through some management interface. A centralized server can also communicate this information.

Furthermore, a base station can obtain information about the parameters of neighboring paging groups from incoming devices that have crossed over from that paging group in the past. The information obtained from incoming devices can be used to optimize DCD/UCD transmissions for future wireless devices.

With knowledge of a neighboring paging group's parameters, the base station 110 can transmit a BCP, and/or the DCD/UCD messages themselves, during the paging listening interval of the neighboring paging groups. This allows a wireless device 104, 106 transferring from one paging group into another to either immediately obtain DCD/UCD or at least determine when DCD/UCD information is scheduled to be transmitted. The wireless device 104, 106, therefore, does not have to monitor every frame, thereby saving battery life. An incoming wireless device 104, 106, by obtaining DCD/UCD (either through a direct transmission or by determining the timing of the next transmission and waking up to receive it at the right time), can determine if it needs to perform a location update with the new base station 110.

In another embodiment, if the paging offset/cycles within a paging group are not synchronized, then a cell determines the specific timing of paging listening intervals of its neighboring cells and transmits the BCP and/or DCD/UCD messages in the listening interval of its neighbor cells even if they are within the same paging group.

In another embodiment of the present invention, the base station 110, and more specifically the MNA transmitter 138, 140, also transmits a message during the listening interval of all paging groups to which the base station belongs. This message includes the DCD/UCD information of its neighboring cells and is referred to as Mobility Neighbor Advertisement ("MNA"). It should be noted that the MNA message can be transmitted at any point in time between transmissions of the DCD/UCD. For example, the MNA message can be transmitted at a ⅓, ½, ⅔ (and the like) point in time between the first transmission and the second transmission of the DCD/UCD.

An idling wireless device 104, 106, which resides in the current cell and follows the schedule of paging listening intervals of one of the paging groups to which the current cell belongs, can decode the MNA message during one of its listening intervals. In this manner, the wireless device 104, 106 can obtain the DCD/UCD of the neighboring cells before roaming into their area. Therefore, idling wireless devices 104, 106 currently residing in this cell can determine if roaming into the neighboring cells also means changing paging groups, and determine in advance the set of actions that are to be taken once in the neighboring cell.

Although illustrated as concurrently resident in the main memory 206, it is clear that respective components of the main memory 206 are not required to be completely resident in the main memory 206 at all times or even at the same time. In one embodiment, the BSC 114 utilizes conventional virtual addressing mechanisms to allow programs to behave as if they have access to a large, single storage entity, referred to herein as a computer system memory, instead of access to multiple, smaller storage entities such as the main memory 206 and data storage device 218. The data storage device 218 can store data on a hard-drive or media such as a CD 222. Note that the term "computer system memory" is used herein to generically refer to the entire virtual memory of the BSC 114.

Although only one CPU 204 is illustrated for computer 202, computer systems with multiple CPUs can be used equally effectively. Embodiments of the present invention further incorporate interfaces that each includes separate, fully programmed microprocessors that are used to off-load processing from the CPU 204. Terminal interface 210 is used to directly connect one or more terminals 220 to computer 202 to provide a user interface to the BSC 114. These terminals 220, which are able to be non-intelligent or fully programmable workstations, are used to allow system administrators and users to communicate with the BSC 114. The terminal 220 is also able to consist of user interface and peripheral devices that are connected to computer 202 and controlled by terminal interface hardware included in the terminal I/F 210 that includes video adapters and interfaces for keyboards, pointing devices, and the like.

An operating system (not shown) included in the main memory is a suitable multitasking operating system such as Linux, UNIX, Windows XP, and Windows Server 2003. Embodiments of the present invention are able to use any other suitable operating system. Some embodiments of the present invention utilize architectures, such as an object oriented framework mechanism, for executing instructions of the components of operating system (not shown) on any processor located within the BSC 114.

The network adapter hardware 212 is used to provide an interface to the network 102. Embodiments of the present invention are able to be adapted to work with any data communications connections including present day analog and/or digital techniques or via a future networking mechanism.

Although the embodiments of the present invention are described in the context of a fully functional computer system, those of ordinary skill in the art will appreciate that embodiments are capable of being distributed as a program product via floppy disk, e.g., CD/DVD 222, or other form of recordable media, or via any type of electronic transmission mechanism.

Wireless Communication Device

Figure 3:
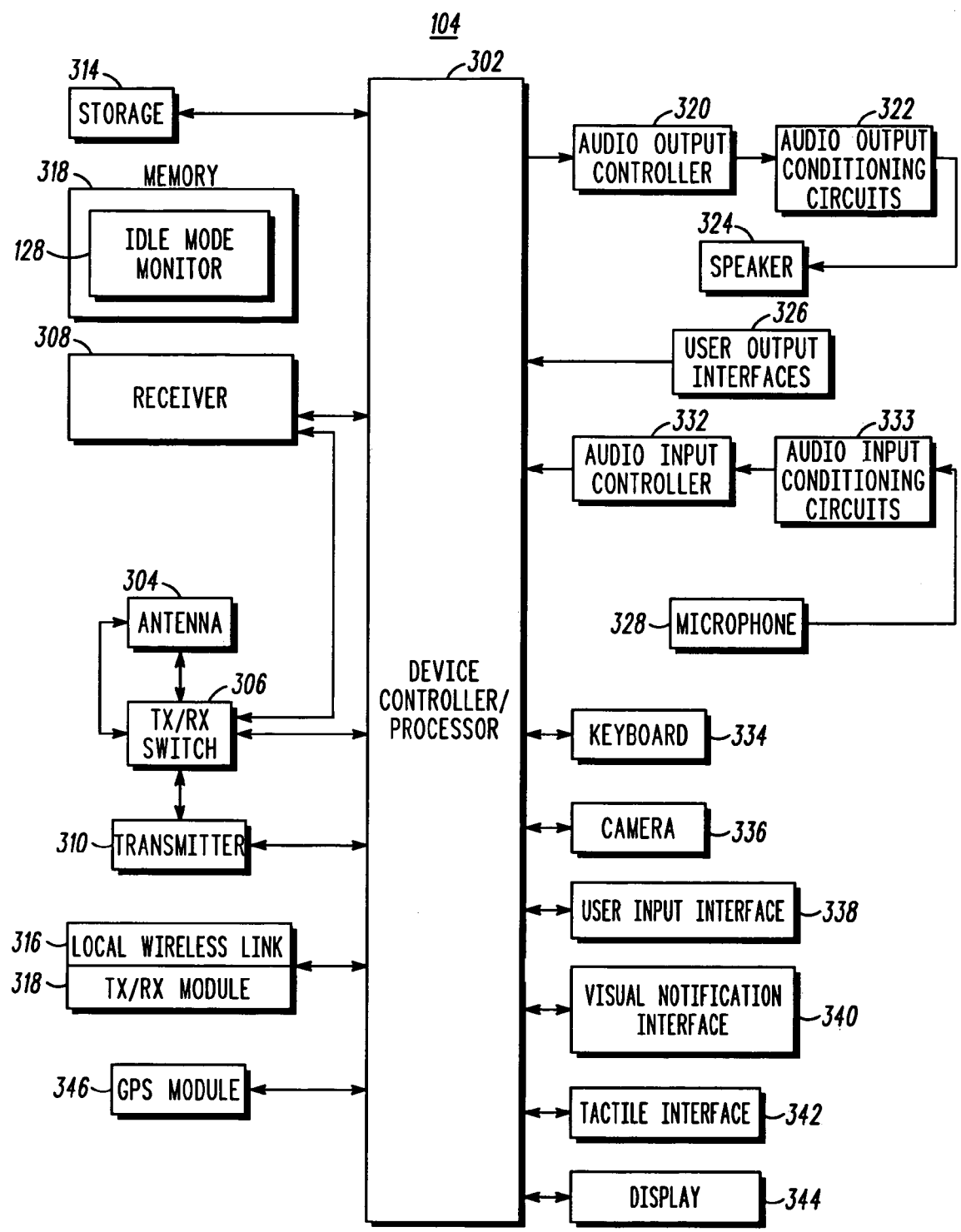
FIG. 3 is a block diagram illustrating a wireless communication device according to an embodiment of the present invention.

FIG. 3 is a block diagram illustrating a more detailed view of the wireless communication device 104. In one embodiment, the wireless communication device 104 is capable of transmitting and receiving wireless information on the same frequency, such as in an 802.16e system using TDD or FDD. The wireless communication device 104 operates under the control of a device controller/processor 302 that controls the sending and receiving of wireless communication signals. In receive mode, the device controller 302 electrically couples an antenna 304 through a transmit/receive switch 306 to a receiver 308. The receiver 308 decodes the received signals and provides those decoded signals to the device controller 302.

In transmit mode, the device controller 302 electrically couples the antenna 304, through the transmit/receive switch 306, to a transmitter 310. The device controller 302 operates the transmitter and receiver according to instructions stored in the memory 312. These instructions include, for example, a neighbor cell measurement-scheduling algorithm. The memory 312 also includes the idle mode monitor 128 for monitoring frames transmitted by a base station 110 and/or paging controller 126. For example, the idle mode monitor 128 detects a BCP transmitted from the base station 110. The monitor 128 determines when the DCD/UCD information is scheduled to be transmitted so that the device 104 can "sleep" until that time.

The wireless communication device 104 also includes non-volatile storage memory 314 for storing, for example, an application (not shown) waiting to be executed on the wireless communication device 104. The wireless communication device 104, in this example, also includes an optional local wireless link 316 that allows the wireless communication device 104 to directly communicate with another wireless device without using a wireless network (not shown). The optional local wireless link 316, for example, is provided by Bluetooth, Infrared Data Access (IrDA) technologies, or the like. The optional local wireless link 316 also includes a local wireless link transmit/receive module 318 that allows the wireless device 104 to directly communicate with another wireless communication device.

The wireless communication device 104 of FIG. 3 further includes an audio output controller 320 that receives decoded audio output signals from the receiver 308 or the local wireless link transmit/receive module 318. The audio controller 320 sends the received decoded audio signals to the audio output conditioning circuits 322 that perform various conditioning functions. For example, the audio output conditioning circuits 322 may reduce noise or amplify the signal. A speaker 324 receives the conditioned audio signals and allows audio output for listening by a user. The audio output controller 320, audio output conditioning circuits 322, and the speaker 324 also allow for an audible alert to be generated notifying the user of a missed call, received messages, or the like. The wireless communication device 104 further includes additional user output interfaces 326, for example, a head phone jack (not shown) or a hands-free speaker (not shown).

The wireless communication device 104 also includes a microphone 328 for allowing a user to input audio signals into the wireless communication device 104. Sound waves are received by the microphone 328 and are converted into an electrical audio signal. Audio input conditioning circuits 330 receive the audio signal and perform various conditioning functions on the audio signal, for example, noise reduction.

An audio input controller 332 receives the conditioned audio signal and sends a representation of the audio signal to the device controller 302.

The wireless communication device 104 also comprises a keyboard 334 for allowing a user to enter information into the wireless communication device 104. The wireless communication device 104 further comprises a camera 336 for allowing a user to capture still images or video images into memory 312. Furthermore, the wireless communication device 104 includes additional user input interfaces 338, for example, touch screen technology (not shown), a joystick (not shown), or a scroll wheel (not shown). In one embodiment, a peripheral interface (not shown) is also included for allowing the connection of a data cable to the wireless communication device 104. In one embodiment of the present invention, the connection of a data cable allows the wireless communication device 104 to be connected to a computer or a printer.

A visual notification (or indication) interface 340 is also included on the wireless communication device 104 for rendering a visual notification (or visual indication), for example, a sequence of colored lights on the display 344 or flashing one ore more LEDs (not shown), to the user of the wireless communication device 104. For example, a received multimedia message may include a sequence of colored lights to be displayed to the user as part of the message. Alternatively, the visual notification interface 340 can be used as an alert by displaying a sequence of colored lights or a single flashing light on the display 344 or LEDs (not shown) when the wireless communication device 104 receives a message, or the user missed a call.

The wireless communication device 104 also includes a tactile interface 342 for delivering a vibrating media component, tactile alert, or the like. For example, a multimedia message received by the wireless communication device 104, may include a video media component that provides a vibration during playback of the multimedia message. The tactile interface 342, in one embodiment, is used during a silent mode of the wireless communication device 104 to alert the user of an incoming call or message, missed call, or the like. The tactile interface 342 allows this vibration to occur, for example, through a vibrating motor or the like.

The wireless communication device 104 also includes a display 344 for displaying information to the user of the wireless communication device 104 and an optional Global Positioning System (GPS) module 346 The optional GPS module 346 determines the location and/or velocity information of the wireless communication device 104. This module 346 uses the GPS satellite system to determine the location and/or velocity of the wireless communication device 104. Alternative to the GPS module 346, the wireless communication device 104 may include alternative modules for determining the location and/or velocity of wireless communication device 104, for example, using cell tower triangulation and assisted GPS.

Signaling Timing Diagrams Utilizing Neighboring Paging Group Information

Figure 4:
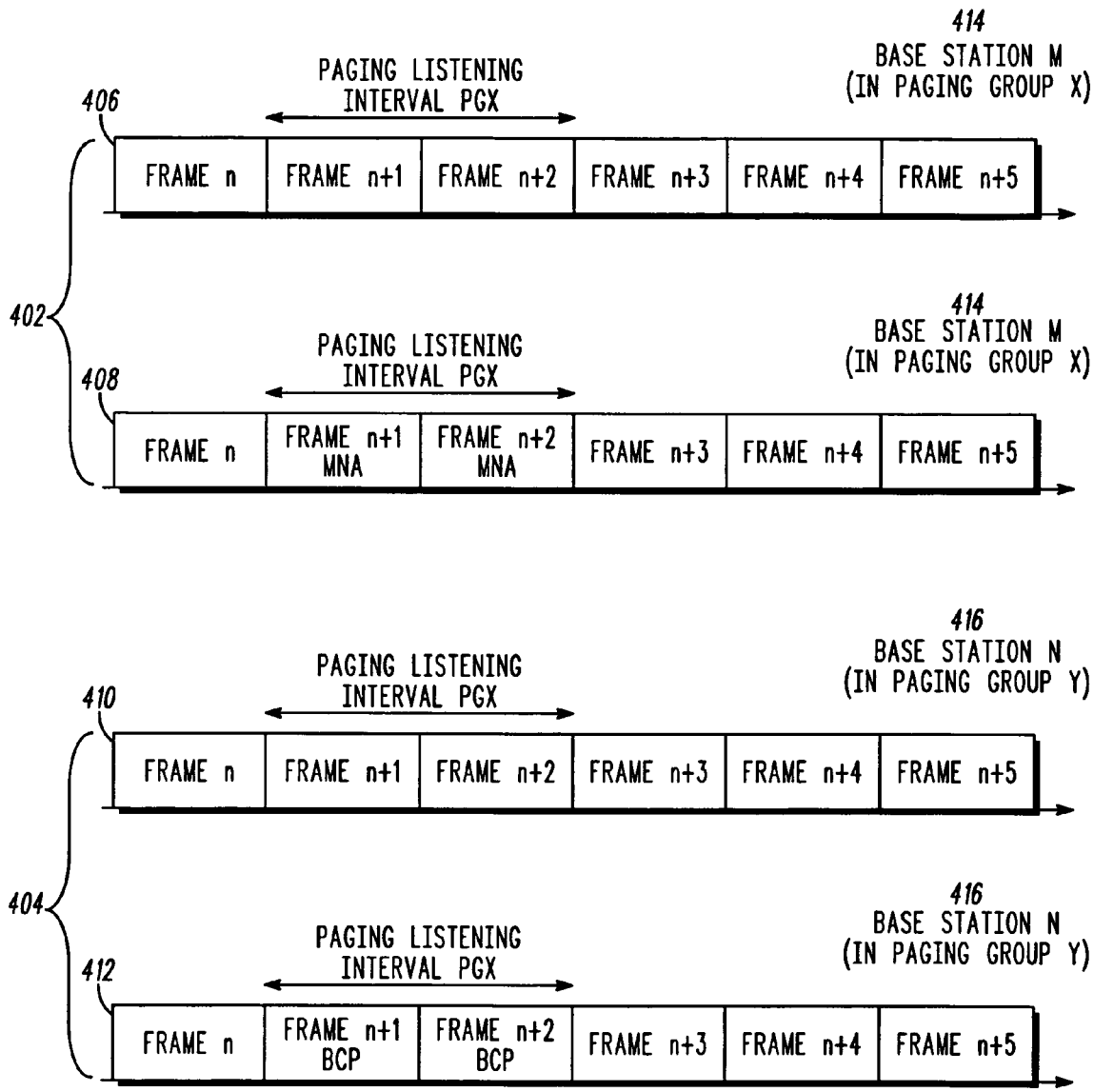
FIG. 4 is a signal timing diagram illustrating various embodiments for transmitting DCD/UCD information of a neighboring paging group and/or a BCP during a paging listen interval of a neighboring paging group, according to an embodiment of the present invention.

FIG. 4 is a timing diagram illustrating the transmission of neighboring cell information during the paging listening interval of a current paging group. FIG. 4 also shows a timing diagram illustrating the transmission of a BCP information during the paging listening interval of a neighboring paging group. FIG. 4 shows a base station M 414 that is in a paging group X and a base station N 416 that is in a paging group Y. The first grouping of frames 402 includes conventional frames 406 used for comparison with a set of frames 408, which illustrate an embodiment of the present invention. In one embodiment of the present invention, a BSC, via the base station M 414, transmits a MNA message during the paging listening interval of the paging group X to which base station 110 belongs. The message MNA includes DCD/UCD information associated with neighboring cells. As can be seen, the conventional frames 406 used during a paging listening interval do not include the MNA message. Transmitting information such as DCD/UCD information associated with neighboring cells allows for a wireless device 104, 106 that is transitioning into a neighboring cell to be aware of the DCD/UCD information such as the information that neighboring base-station N does not belong to paging group X but to paging group Y. Using this information, the wireless device does not have to wait for the neighboring base station to transmit its DCD/UCD and can take the necessary actions such as location update immediately after roaming into the neighboring cell, without wasting battery resources.

The second group of timing diagrams 404 includes a first set of conventional frames 410 used for comparison with a second set of frames 412, which illustrate an embodiment of the present invention. In one embodiment of the present invention, a base station N, which is in a paging group Y transmits a BCP during the paging listening interval of the neighboring paging groups such as paging group X. This allows wireless devices 104, 106 transitioning into the paging group Y to know when the DCD/UCD information for the paging group Y is scheduled to be transmitted. This is because wireless devices originating from paging group X still wakes up based on the schedule of paging listening interval of paging group X. Therefore, when the base station N (which is in paging group Y) transmits a BCP at the paging listening intervals of paging group X, any wireless devices originating from paging group X, detects the BCP as soon as they become available. The wireless devices can then "sleep" until it is time to receive the DCD/UCD information thereby saving battery their battery resources. In a further embodiment of the present invention, a base station N (in paging group Y) transmits its DCD/UCD information during the paging listening interval of the neighboring paging groups such as paging group X. In this embodiment, wireless devices roaming into paging group Y from paging group X can immediately read the DCD/UCD information as soon as they wake up. As can be seen, the conventional frames do not include information (BCP and/or DCD/UCD) transmitted in accordance with the timing of paging listening intervals of neighboring paging groups.

Timing Diagrams For Transmission Of BCP

Figure 5:
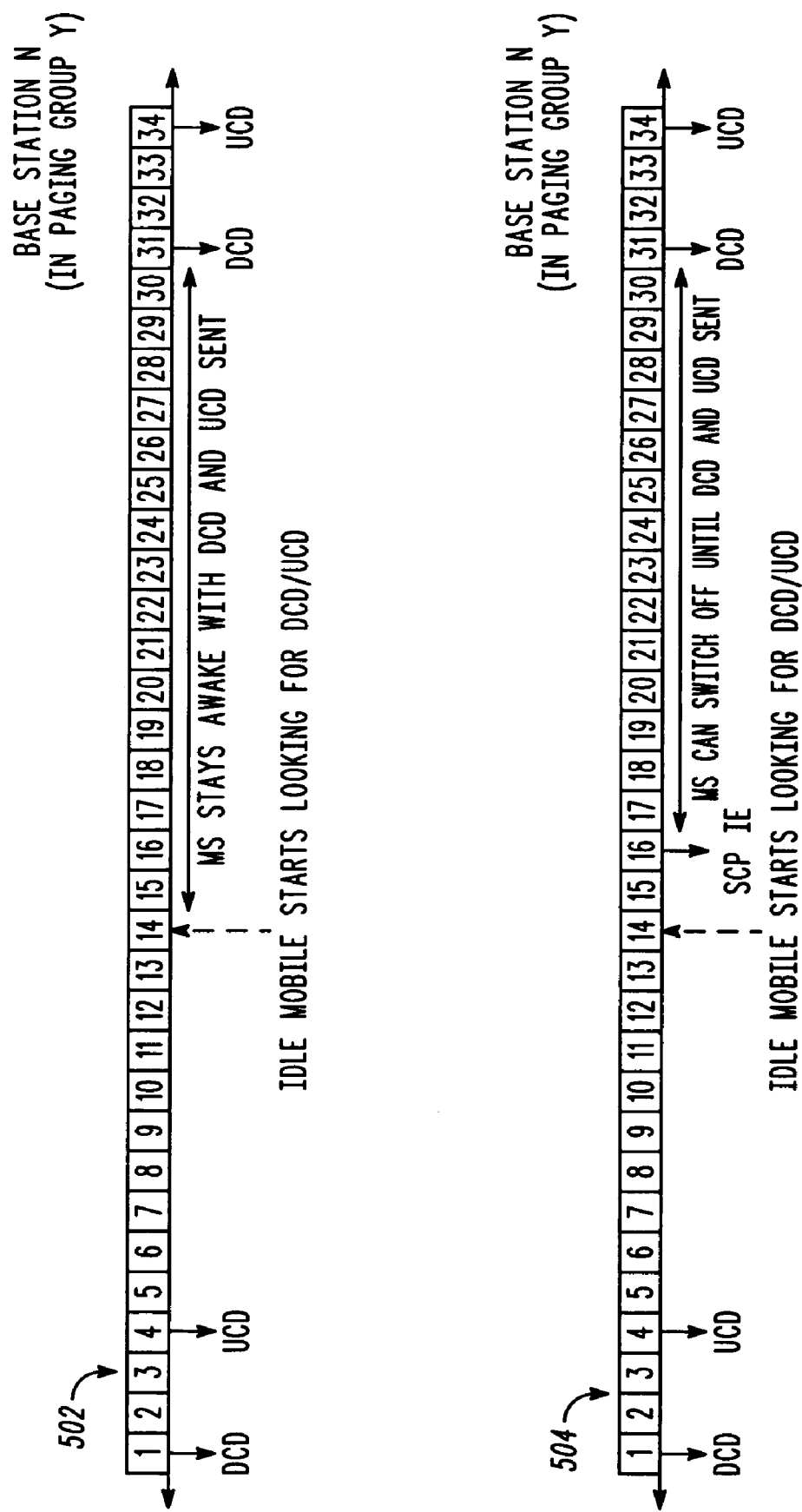
FIG. 5 is a signaling timing diagram illustrating a signal transmission sequence according to an embodiment of the present invention.

FIG. 5 illustrates timing diagrams showing transmitting a BCP by a base station 110 for notifying a wireless device of the transmission time of DCD/UCD information. The first set of frames 502 illustrates a conventional method for determining the DCD/UCD information associated with a cell. For example, if a wireless device 104, 106 "wakes up" at frame 14, the device 104, 106 monitors every frame until it decodes a DCD/UCD information. This unnecessarily wastes battery life resources. The second set of frames 504 illustrates an embodiment of the present invention. For example, at frame 14 the wireless device 104, 106 "wakes up" and monitors each frame until it receives the BCP.

The BCP is received at frame 16 and notifies the wireless device 104, 106 that DCD information is scheduled to be transmitted on frame 31 and UCD information is scheduled to be transmitted on frame 34. The wireless device 104, 106 switches off until frame 31 where it receives the DCD information. In one embodiment, the wireless device 104, 106 stays on until it receives the UCD information since the UCD information is transmitted so closely to the DCD information. In another embodiment, the wireless device 104 106 switches off after receiving the DCD information and "wakes up" at frame 34 to receive the UCD information. The wireless device 104 is able to "sleep" until the DCD/UCD information is received thereby saving battery life.

Figure 6:
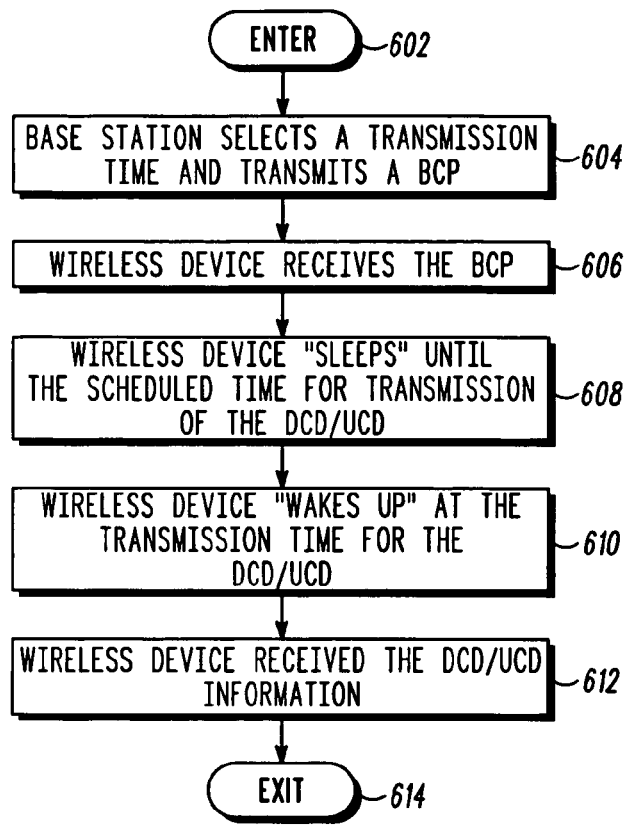
FIG. 6 is an operational flow diagram illustrating a process of transmitting a BCP for notifying a subscriber wireless device of the transmission time of DCD/UCD information, according to an embodiment of the present invention.

Transmission Of A BCP For Notifying a Wireless Device OF DCD/UCD Transmission Time FIG. 6 is an operational flow diagram illustrating an process of a system for transmitting a BCP to notify wireless devices 104, 106 of the transmission time of DCD/UCD. The operational flow diagram of FIG. 6 begins at step 602 and flows directly to step 604. The base station 110, 112, at step 604, selects a transmission time and transmits a BCP. The BCP can be transmitted during the paging listening interval of its paging group, the paging listening interval of a neighboring paging group, or at any given interval of time.

The wireless devices 104, 106, at step 606, receive the BCP and determine the transmission time of the DCD/UCD. The wireless devices 104, 106, at step 608, "sleep" until the scheduled time for transmission of the DCD/UCD. The wireless devices 104, 106, at step 610, "wake up" at the transmission time to receive the DCD/UCD. The wireless devices 104, 106, at step 612, receive the DCD/UCD. The control flow then exits at step 614.

One advantage of the present invention is that the wireless devices 104, 106 do not have to continually monitor every frame for the DCD/UCD. The wireless devices can "sleep" for the time period after receiving the BCP to when the DCD/UCD is transmitted. This saves battery resources at the wireless devices.

Transmission Of A DCD/UCD Information Associated With Neighboring Cells

Figure 7:
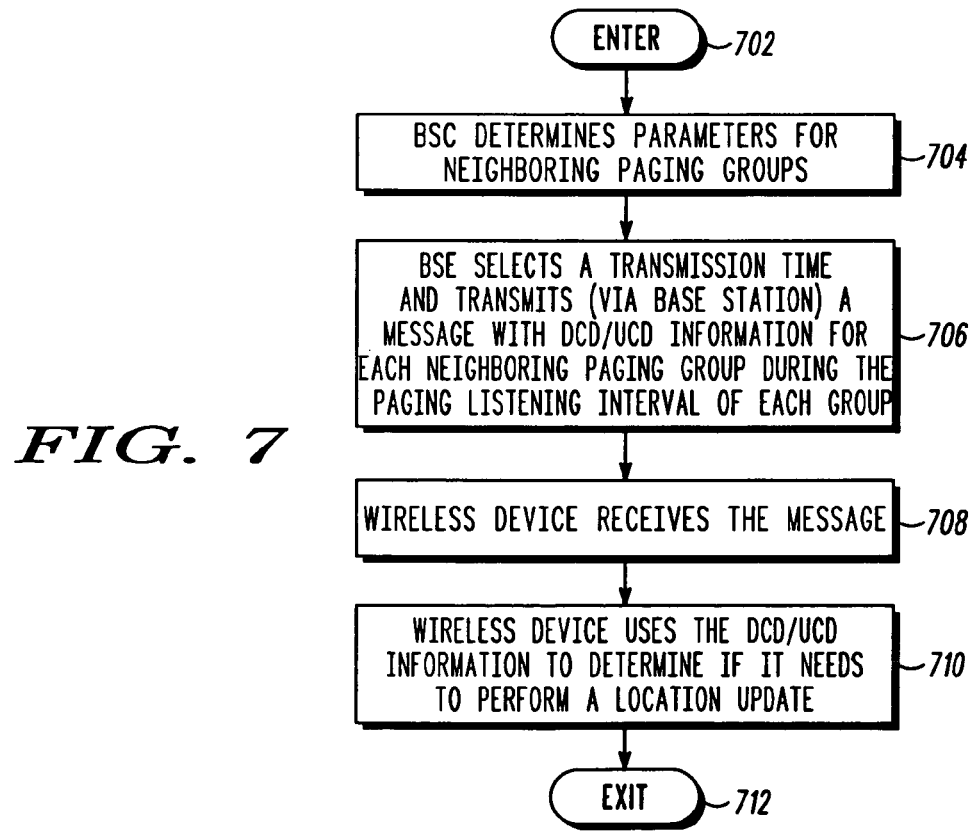
FIG. 7 is an operational flow diagram illustrating a process of transmitting a message including DCD/UCD information of at least one neighboring cell during a paging listening interval of the at least one neighboring group according to an embodiment of the present invention.

FIG. 7 is an operational flow diagram illustrating an process of a system transmitting DCD/UCD information associated with neighboring cells during the paging listening interval of each paging group. The operational flow diagram of FIG. 7 begins at step 702 and flows directly to step 704. The BSC 114, at step, 704 determines the parameters associated with DCD and UCD of neighboring cells. For example, the BSC 114 can directly communicate with the other BSCs. The neighboring cells, in one embodiment, may be part of different paging groups. Any idling mobile devices crossing over from the current cell into a neighboring cell can use the DCD and UCD information obtained for a neighboring cell for determining if they have roamed into a different paging group.

The BSC 114, at step 706, selects a transmitting time and transmits (via its base station 110) a message including DCD/UCD information for at least one neighboring cell. This message is transmitted, in one embodiment, during the paging listening interval of the paging group that the BSC belongs to, a paging listening interval of a neighboring cell, or at any given interval of time. Wireless devices 104, 106 within the paging group of the BSC 114, at step 708, receive the message. The wireless devices 104, 106, at step 710, determine if they need to perform a location update in the event that it moves to those cells by examining the DCD/UCD of the neighboring cells. The control flow then exits at step 712.

Figure 8:
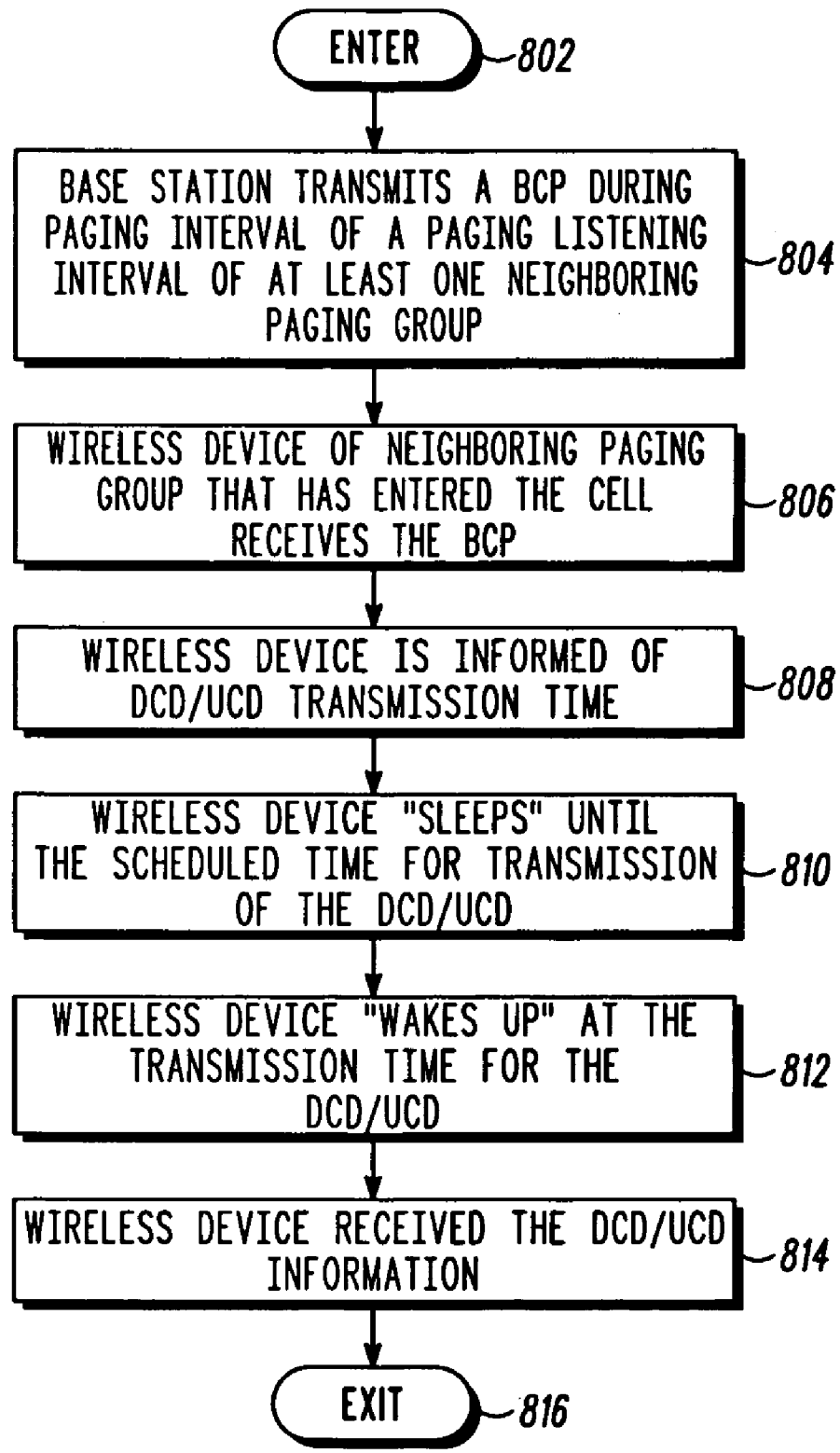
FIG. 8 is an operational flow diagram illustrating a process of transmitting a BCP during the paging listening interval of a neighboring paging group according to an embodiment of the present invention.

Transmission Of A BCP During A Paging Listening Interval Of A Neighboring Paging Cell FIG. 8 is an operational flow diagram illustrating an process of transmitting a BCP during at least one neighboring paging group's paging listening interval. The base station 110, 112, at step 804, selects a transmission time and transmits a BCP during the paging listening interval of at least one neighboring paging group. The wireless device 104, 106 of a neighboring paging group that has entered into the current paging group, at step 806, receives the BCP. In another embodiment, the DCD/UCD information of the current cell is transmitted by the base station 110, 112 during the paging interval of the neighboring paging group.

The wireless devices 104, 106, at step 808, are notified by the BCP of the transmission time of the DCD/UCD. The wireless devices 104, 106, at step 810, sleep until the scheduled time for transmission of the DCD/UCD. The wireless devices 104, 106, at step 812, "wake up" at the transmission time for the DCD/UCD. The wireless devices 104, 106, at step 814, receive the DCD/UCD information. The control flow then exits at step 816.

NON-LIMITING EXAMPLES

The present invention can be realized in hardware, software, or a combination of hardware and software. A system according to a preferred embodiment of the present invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method, with a wireless communication system, for wirelessly transmitting at least one of a downlink channel descriptor and an uplink channel descriptor for reception by at least one wireless device, the method comprising:

selecting at least one transmission time for transmitting, for reception by at least one wireless device, at least one of:

a pointer indicating a transmission time for at least one of a downlink channel descriptor and an uplink channel descriptor, wherein the pointer is transmitted at a time, between a first transmission and a second transmission of the at least one of downlink channel descriptor and uplink channel descriptor, selected to reduce a time interval for the at least one wireless device to search for the at least one of the downlink channel descriptor and uplink channel descriptor; and a message including downlink channel descriptor information and uplink channel descriptor information associated with at least one neighboring cell, wherein the message is transmitted during the time between the first transmission and the second transmission of the at least one of downlink channel descriptor and uplink channel descriptor.

2. The method of claim 1, wherein the time between the first transmission and the second transmission of the at least one of downlink channel descriptor and uplink channel descriptor corresponds to a paging listening interval associated with a home paging group.

3. The method of claim 1, wherein the pointer is transmitted between the first transmission and the second transmission of the at least one of downlink channel descriptor and uplink channel descriptor, at substantially any of the following times:
   a ⅓ point in time between the first transmission and the second transmission of the at least one of downlink channel descriptor and uplink channel descriptor;
   a mid-point in time therebetween; and
   a ⅔ point in time therebetween.

4. The method of claim 1, wherein the time between the first transmission and the second transmission of the at least one of downlink channel descriptor and uplink channel descriptor corresponds to a paging listening interval associated with at least one neighboring paging group.

5. The method of claim 1, wherein choosing specific transmission time of the message further comprises:
   transmitting the message during a paging listening interval associated with a home paging group.

6. The method of claim 1, wherein the message is transmitted between the first transmission and the second transmission of the at least one of downlink channel descriptor and uplink channel descriptor, at substantially any of the following times:
   a ⅓ point in time between the first transmission and the second transmission of the at least one of downlink channel descriptor and uplink channel descriptor;
   a mid-point in time therebetween; and
   a ⅔ point in time therebetween.

7. The method of claim 1, further comprising:
   determining at least one of offset parameters and cycle parameters for at least one neighboring paging group.

8. The method of claim 7, wherein the determining further comprises:
   receiving the at least one of offset parameters and cycle parameters from at least one of:
   the at least one neighboring paging group; and
   at least one wireless device transitioning from the at least one neighboring paging group.

9. A method, with a wireless device, for receiving at least one of a downlink channel descriptor and an uplink channel descriptor, the method comprising,
   receiving a pointer indicating a transmission time of at least one of a downlink channel descriptor and an uplink channel descriptor;
   ceasing to monitor for the at least one of the downlink channel descriptor and uplink channel descriptor in response to receiving the pointer;
   determining if the transmission time for the least one of the downlink channel descriptor and the uplink channel descriptor has occurred;
   monitoring, in response to the transmission time being determined to have occurred, for reception of the at least one of the downlink channel descriptor and the uplink channel descriptor;
   determining, in response to receiving the at least one of the downlink channel descriptor and the uplink channel descriptor, a new time interval between transmissions of the at least one of the downlink channel descriptor and the uplink channel descriptor; and
   receiving a message including at least one of a downlink channel descriptor and uplink channel descriptor information at a time of transmission of the at least one of the downlink channel descriptor and the uplink channel descriptor associated with a neighboring paging group.

10. A method, with a wireless device, for receiving at least one of a downlink channel descriptor and an uplink channel descriptor, the method comprising,
   receiving a pointer indicating a transmission time of at least one of a downlink channel descriptor and an uplink channel descriptor;
   ceasing to monitor for the at least one of the downlink channel descriptor and uplink channel descriptor in response to receiving the pointer;
   determining if the transmission time for the least one of the downlink channel descriptor and the uplink channel descriptor has occurred;
   monitoring, in response to the transmission time being determined to have occurred, for reception of the at least one of the downlink channel descriptor and the uplink channel descriptor;
   determining, in response to receiving the at least one of the downlink channel descriptor and the uplink channel descriptor, a new time interval between transmissions of the at least one of the downlink channel descriptor and the uplink channel descriptor; and
   entering into at least one neighboring cell;
   determining, based on the channel descriptor and uplink channel descriptor information received in the message, that a location update function needs to be performed; and
   performing the location update function in response to the determination.

11. An information processing system in a wireless communication system for wirelessly transmitting at least one of a downlink channel descriptor and an uplink channel descriptor for reception by at least one wireless device, the information processing system comprising:
   at least one processing unit;
   a memory communicatively coupled to the at least one processing unit; and
   a transmitter communicatively coupled to the memory and the at least one processing unit, the transmitter for selecting at least one transmission time, whereupon the transmitter transmits, for reception by at least one wireless device, at least one of:
   a pointer indicating a transmission time for at least one of a downlink channel descriptor and an uplink channel descriptor, wherein the pointer is transmitted at a time, between a first transmission and a second transmission of the at least one of downlink channel descriptor and uplink channel descriptor, selected to reduce a time interval for the at least one wireless device to search for the at least one of the downlink channel descriptor and uplink channel descriptor; and
   a message including downlink channel descriptor information and uplink channel descriptor information associated with at least one neighboring cell, wherein the message is transmitted during the time between the first transmission and the second transmission of the at least one of downlink channel descriptor and uplink channel descriptor.

12. The information processing system of claim 11, wherein the transmitter transmits the pointer during a paging listening interval associated with a home paging group.

13. The information processing system of claim 11, wherein the transmitter transmits the pointer during a paging listening interval associated with at least one neighboring paging group.

14. The information processing system of claim 11, wherein the transmitter transmits the pointer between the first transmission and the second transmission of the at least one of downlink channel descriptor and uplink channel descriptor, at substantially any of the following times:
- a ⅓ point in time between the first transmission and the second transmission of the at least one of downlink channel descriptor and uplink channel descriptor;
- a mid-point in time therebetween; and
- a ⅔ point in time therebetween.

15. The information processing system of claim 11, wherein the transmitter transmits the message during a paging listening interval associated with a home paging group.

16. The information processing system of claim 11, wherein the transmitter transmits the message during a paging listening interval associated with at least one neighboring paging group.

17. The information processing system of claim 11, wherein the transmitter transmits the message between the first transmission and the second transmission of the at least one of downlink channel descriptor and uplink channel descriptor, at substantially any of the following times:
- a ⅓ point in time between the first transmission and the second transmission of the at least one of downlink channel descriptor and uplink channel descriptor;
- a mid-point in time therebetween; and
- a ⅔ point in time therebetween.

18. The information processing system of claim 11, further comprising:
- a receiver for receiving at least one of offset parameters and cycle parameters associated with at least one neighboring paging group.

19. The information processing system of claim 11, wherein the receiver receives the at least one of offset parameters and cycle parameters from at least one of:
- the at least one neighboring paging group; and
- at least one wireless device transitioning from the at least one neighboring paging group.

* * * * *